X 0009267
S. T. Walker,
Hydrant.
Reissued July 1, 1836.
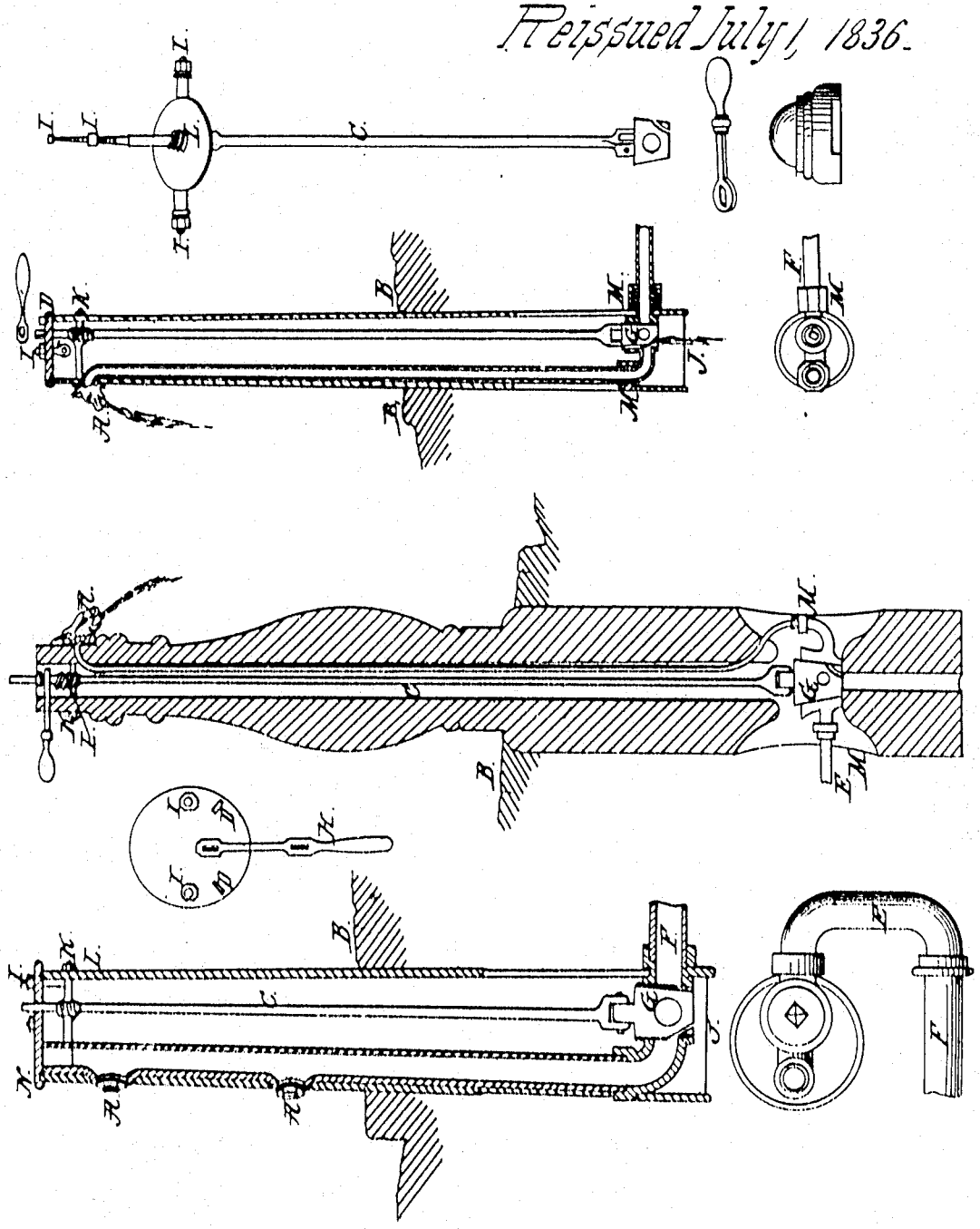

MISSING PAGE TEMPORARY NOTICE

PATENT # X 9267 FOR ISSUE DATE 7-1-1836

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text